(12) United States Patent
Shin et al.

(10) Patent No.: US 9,834,222 B2
(45) Date of Patent: Dec. 5, 2017

(54) DETECTING VEHICLE MANEUVERS WITH MOBILE PHONES

(71) Applicant: THE REGENTS OF THE UNIVERSITY OF MICHIGAN, Ann Arbor, MI (US)

(72) Inventors: Kang G. Shin, Ann Arbor, MI (US); Dongyao Chen, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 15 days.

(21) Appl. No.: 15/135,956

(22) Filed: Apr. 22, 2016

(65) Prior Publication Data

US 2016/0311442 A1 Oct. 27, 2016

Related U.S. Application Data

(60) Provisional application No. 62/152,475, filed on Apr. 24, 2015.

(51) Int. Cl.
*B60W 40/10* (2012.01)
*B60W 40/06* (2012.01)
(Continued)

(52) U.S. Cl.
CPC ............ *B60W 40/10* (2013.01); *B60W 40/06* (2013.01); *B60W 40/09* (2013.01); *H04W 4/046* (2013.01); *B60W 2420/905* (2013.01)

(58) Field of Classification Search
CPC ...... B60W 40/10; B60W 40/06; B60W 40/09; B60W 2420/905; H04W 4/046
See application file for complete search history.

(56) References Cited

U.S. PATENT DOCUMENTS 8,457,923 B2 6/2013 Ohkubo
2006/0232444 A1 10/2006 Lee
(Continued)

FOREIGN PATENT DOCUMENTS

CN 104408917 A 3/2015

OTHER PUBLICATIONS

D. A. Johnson et al "Driving Style Recognition Using a Smartphone as a Sensor Platform", 14th International IEEE Conference on Intelligent Transportation Systems, (Oct. 2011).
(Continued)

*Primary Examiner* — Calvin Cheung
(74) *Attorney, Agent, or Firm* — Harness, Dickey & Pierce, P.L.C.

(57) ABSTRACT

A vehicle maneuver detection application is proposed for driving assistant systems. The application can accurately and inexpensively detect and differentiate vehicle steering maneuvers by utilizing built-in sensors on smartphones or other portable computing device residing in a vehicle. By leveraging an effective bump detection algorithm and studying the nature of steering, the application is capable of differentiating various steering patterns, such as lane change, turn, and driving on curvy roads. Practicality of the application is demonstrates by two use cases: careless steering detection and fine-grained lane guidance. Thus, the application provides new functionalities without relying on cameras to provide a broader range of driving assistance.

20 Claims, 13 Drawing Sheets

(51) Int. Cl.
*B60W 40/09* (2012.01)
*H04W 4/04* (2009.01)

(56) References Cited

U.S. PATENT DOCUMENTS

| | | | |
|---|---|---|---|
| 2012/0053805 A1* | 3/2012 | Dantu | B60W 40/09 |
| | | | 701/70 |
| 2014/0278206 A1 | 9/2014 | Girod et al. | |
| 2015/0019266 A1 | 1/2015 | Stempora | |
| 2015/0312404 A1* | 10/2015 | Abramson | H04W 4/027 |
| | | | 455/418 |
| 2015/0332408 A1* | 11/2015 | Menon | G07C 5/008 |
| | | | 705/4 |
| 2015/0369836 A1* | 12/2015 | Cordova | G01P 15/18 |
| | | | 702/141 |
| 2016/0113552 A1* | 4/2016 | Carter | G01P 15/00 |
| | | | 702/141 |
| 2016/0325756 A1* | 11/2016 | Cordova | G01P 21/00 |

OTHER PUBLICATIONS

J. Ma, et al "Vehicle Steering Angle Estimation Using Off-the-shelf Sensor Technologies", ICTTIs, ASCE (2013).

J.M. Clanton, et al A Low-Cost Solution for an Integrated Multisensor Lane Departure Warning System, IEEE Transactions on Intelligent Transportation Systems, vol. 10, No. 1 (Mar. 2009).

L. Bergasa, et al "DriveSafe: an App for Alerting Inattentive Drivers and Scoring Driving Behaviors", IEEE Intelligent Vehicles Symposium (IV), (Jun. 2014).

* cited by examiner

Lane Change

A S-Shaped Curvy Road

Turning

A L-Shaped Curvy Road

Testing Route #1, Around Campus 3.3 Miles

Testing Route #2, Freeway Included, 8.3 Miles

DETECTING VEHICLE MANEUVERS WITH MOBILE PHONES

CROSS-REFERENCE TO RELATED APPLICATIONS

This application claims the benefit of U.S. Provisional Application No. 62/152,475 filed on Apr. 24, 2015. The entire disclosure of the above application is incorporated herein by reference.

FIELD

The present disclosure relates to techniques for detecting vehicle maneuvers using a mobile phone or other types of portable devices which may reside in a vehicle.

BACKGROUND

Automobiles bring a wide range of conveniences as well as fatalities. In 2012, the reported number of fatalities from road accidents was 30,800 in the U.S. alone. Of these fatalities, 23.1% involved lane control—i.e., merging or changing lines or driving on curvy roads—and 7.7% involved turning maneuvers, i.e., turning left/right or making U-turns. In total 30.8% of the fatalities were related to vehicle steering maneuvers.

As most of these fatalities had resulted from the driver's careless or erroneous steering, those accidents could have been minimized or prevented if effective safety mechanisms had been deployed in the vehicles. There has been an on-going push for incorporating electronic safety features in vehicles to assist drivers' steering.

Many existing driving assistance systems, such as lane-departure warning or lane-keeping assistance, are exploiting the advanced built-in sensors (e.g., cameras, radars, and infrared sensors), or utilizing existing sensors on smartphones to detect the steering maneuvers in order to assist driving. However, these approaches suffer two limitations: many built-in sensors are only available on newer high-end cars, and hence such safety solutions cannot be applied to a wide range of type/year models of cars; and both built-in sensors and smartphone-based applications overly rely on cameras to get road information. Although such systems claim that smartphone cameras are sufficient in assisting the driver, they have limitations in terms of computational overhead and inaccuracy. The accuracy of camera-based approaches depends on visibility, thus render ineffective in various driving conditions with limited visibility.

Alternatively, smartphone sensors, such as gyroscope, accelerometer, magnetometer, etc., can be exploited to detect vehicle steering maneuvers and thus perform the same steering-assistance functionalities that would have been achieved with use of cameras. These camera-free approaches have advantages of requiring much less computational resources and power, and also being immune to visibility distortions. However, it is known to be very difficult to differentiate the steering maneuvers, which is one of the main reasons for camera-based approaches being most prevalent.

This section provides background information related to the present disclosure which is not necessarily prior art.

SUMMARY

This section provides a general summary of the disclosure, and is not a comprehensive disclosure of its full scope or all of its features.

A method is provided for detecting vehicle maneuvers using a mobile phone residing in the vehicle. The method includes: receiving signals from two or more sensors residing in the mobile phone while the vehicle is moving, where the signals are indicative of vehicle movement and reported relative to a coordinate system associated with the mobile phone; converting the signals from the two or more sensors from the phone coordinate system to a geographic coordinate system; deriving a detection signal indicative of angular speed of the vehicle about a vertical axis of the geographic coordinate system, where the detection signal is derived from the converted signals; correlating the detection signal to one of a plurality of predefined signatures, where each signature represents a different maneuver made by a vehicle; determining a direction of travel for the vehicle; determining a horizontal displacement of the vehicle relative to the direction of travel; and identifying a maneuver made by the vehicle based on the correlation of the detected signal to one of the plurality of predefined signatures and magnitude of the horizontal displacement of the vehicle. The geographic coordinate system includes a vertical axis defined in relation to surface the vehicle is traversing upon and the vertical axis does not align with any of the axes that define the phone coordinate system.

Correlating the detection signal to one of a plurality of predefined signatures includes identifying one or two bumps in the detection signal, where one bump correlates to turn by the vehicle and two bumps correlates to a lane change by the vehicle.

Vehicle maneuvers may be classified as either a lane change, a turn or a curvy road. Identifying a maneuver made by the vehicle includes comparing magnitude of the horizontal displacement to a threshold; and classifying the maneuver as a curvy road in response to a determination that the magnitude of the horizontal displacement exceeds the threshold. In one aspect, horizontal displacement is determined by determining velocity of the vehicle along the direction of travel; determining angular speed of the vehicle about a vertical axis of the geographic coordinate system; and determining horizontal displacement as a function of velocity and angular speed of the vehicle. Additionally, a turn may be further classified as either a right turn, a left turn or a U-turn based on a difference in vehicle heading angle between start and end of vehicle maneuver.

In another aspect, the method for detecting vehicle maneuvers includes: receiving a signal from an inertial sensor of the computing device while the vehicle is moving, where the signal is indicative of angular speed of the vehicle about a vertical axis; detecting one or more pulses in the signal within a fixed time period, where one pulse with the fixed time period correlates to a possible turn by the vehicle and two pulses within the fixed time period correlates to a possible lane change by the vehicle; determining a direction of travel for the vehicle; and determining a horizontal displacement of the vehicle relative to the direction of travel.

In response to detecting two pulses in the signal, the magnitude of the horizontal displacement is compared to a first threshold. The vehicle maneuver is classified as a curvy road in response to a determination that the magnitude of the horizontal displacement exceeds the first threshold; and the vehicle maneuver is classified as a lane change in response to a determination that the magnitude of the horizontal displacement is less than the first threshold.

The method may further include determining whether amplitude of first pulse of the two detected pulses is higher or lower than a baseline value; classifying the vehicle maneuver as a possible change to left lane in response to determining that the amplitude of the first pulse is higher than a baseline value; and classifying the vehicle maneuver as a possible change to right lane in response to determining that the amplitude of the first pulse is lower than a baseline value.

In response to detecting one pulse in the signal, a determination is made as to whether amplitude of the one detected pulse is higher or lower than a baseline value. The vehicle maneuver is initially classified as a possible left turn in response to determining that the amplitude of the one detected pulse is higher than a baseline value; and initially classified as a possible right turn in response to determining that the amplitude of the one detected pulse is lower than a baseline value.

In response to classifying the vehicle maneuver as a possible right turn, the magnitude of the horizontal displacement is compared to a right turn threshold. The vehicle maneuver is classified as a curvy road in response to a determination that the magnitude of the horizontal displacement exceeds the right turn threshold; and the vehicle maneuver is classified as a right turn in response to a determination that the magnitude of the horizontal displacement is less than the right turn threshold.

On the other hand, in response to classifying the vehicle maneuver as a possible left turn, the magnitude of the horizontal displacement is compared to a left turn threshold. The vehicle maneuver is classified as a curvy road in response to a determination that the magnitude of the horizontal displacement exceeds the left turn threshold; and the vehicle maneuver is classified as a right turn in response to a determination that the magnitude of the horizontal displacement is less than the left turn threshold, where the value of the left turn threshold differs from value of the right turn threshold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 14:
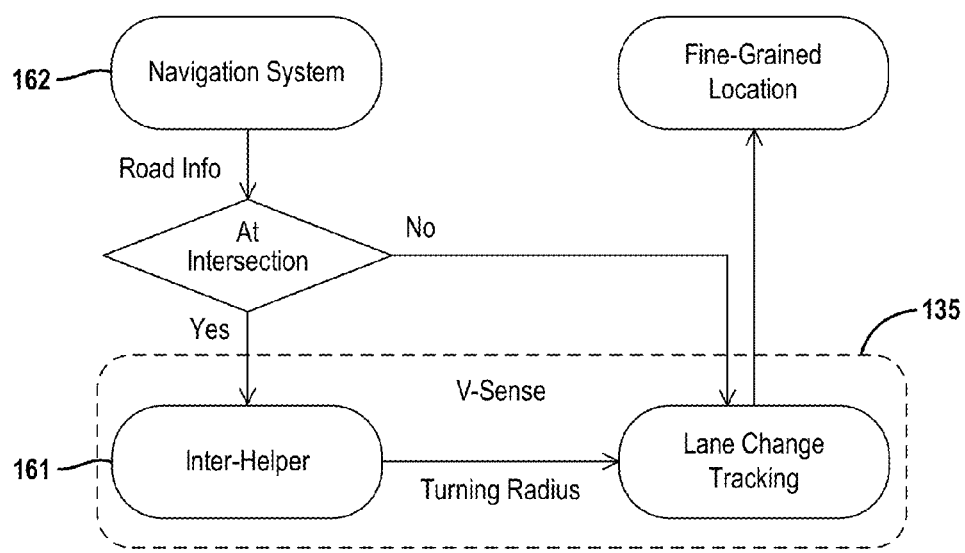
Figure 15:
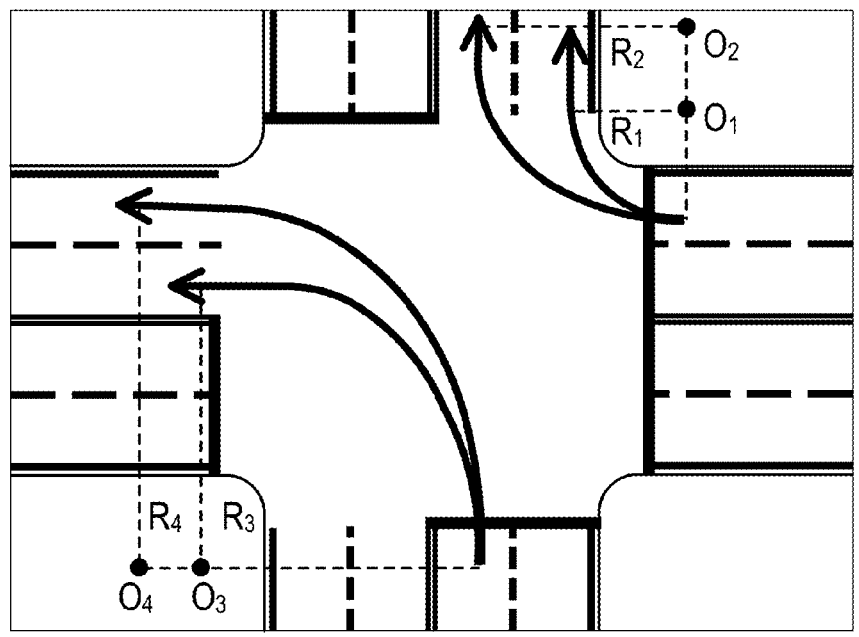
Figure 16:
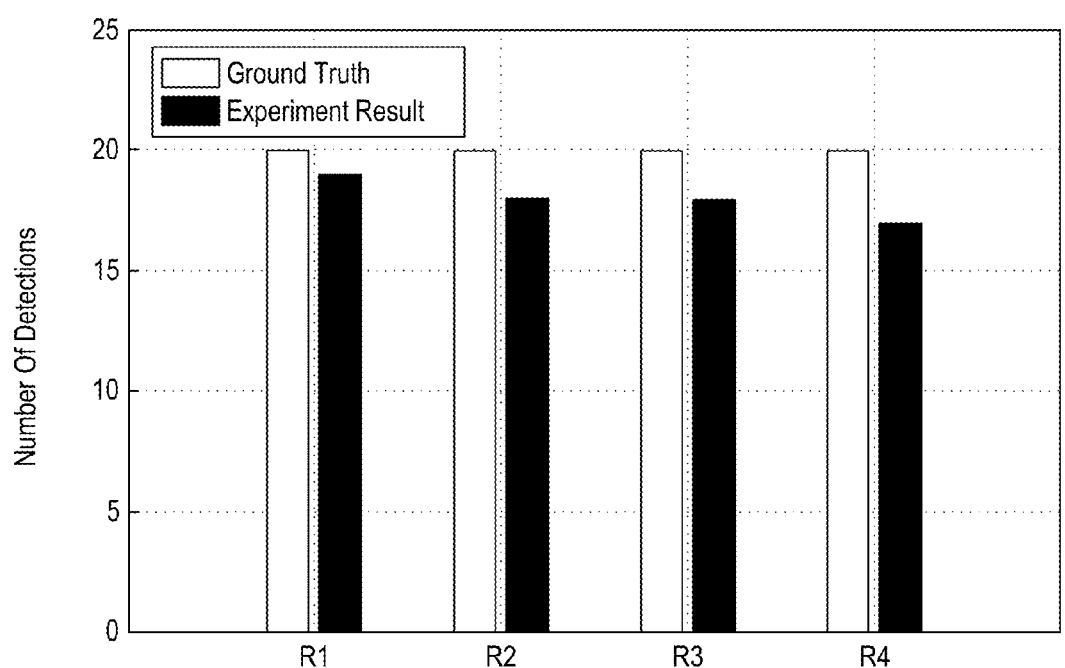

FIG. 14 diagram depicting information flow of fine-grained lane guidance by incorporating a navigation system with the V-Sense technique;

FIG. 15 is a diagram showings turns and the corresponding turning radius at a 4-lane single carriageway intersection; and FIG. 16 is a graph illustrating the performance of the InterHelper module.

Corresponding reference numerals indicate corresponding parts throughout the several views of the drawings.

DETAILED DESCRIPTION

Example embodiments will now be described more fully with reference to the accompanying drawings.

Figure 1:
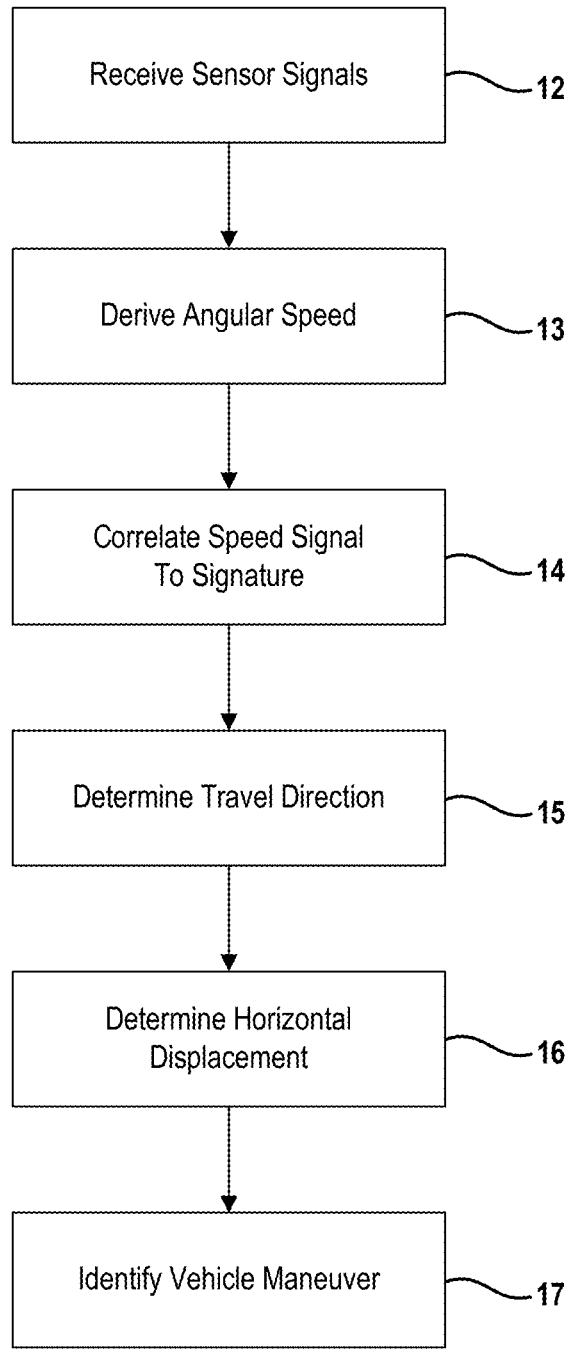
FIG. 1 is a flowchart depicting a technique for detecting vehicle maneuvers using a mobile device residing in a vehicle.

FIG. 1 depicts a technique for detecting vehicle maneuvers using a mobile phone residing in the vehicle (also referred to herein as "V-Sense"). In an example embodiment, this technique is implemented as vehicle steering sensing middleware on a mobile phone, which overcomes the limitations and difficulties inherent in the existing camera-based and camera-free approaches. While reference is made throughout this disclosure to mobile phones, it is readily understood that the technique set forth herein can be implemented using other types of computing devices, such as tablets or watches.

In the example embodiment, inertial measurement units (i.e., sensors) residing in a mobile phone are used to detect steering maneuvers of the vehicle. Signals from one or more inertial sensors are received at 12 by a computer processor while the vehicle is moving. Thus, the signals are indicative of vehicle movement and reported relative to a coordinate system associated with the mobile phone. The computer processor preferably resides in the mobile phone although it may part of the vehicle or reside outside of the vehicle. Other types of motion sensors are also contemplated by this disclosure.

Figure 2:
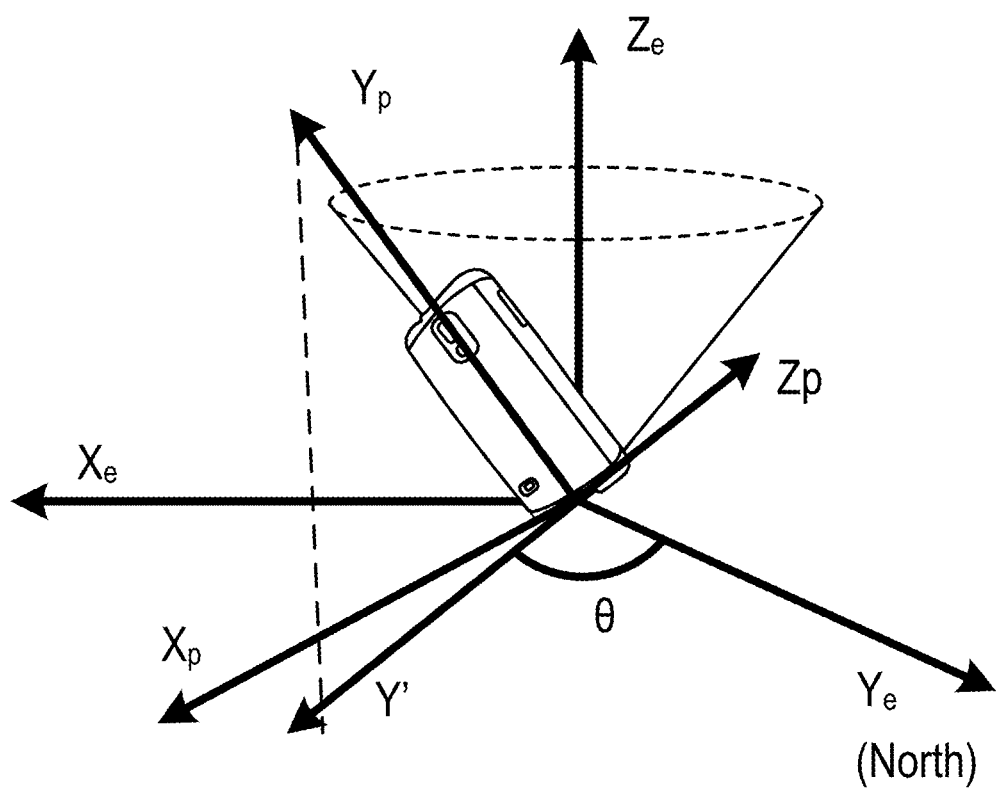
FIG. 2 is a diagram illustrating alignment of a phone coordinate system with a geo-frame coordinate system.
Figure 3A:
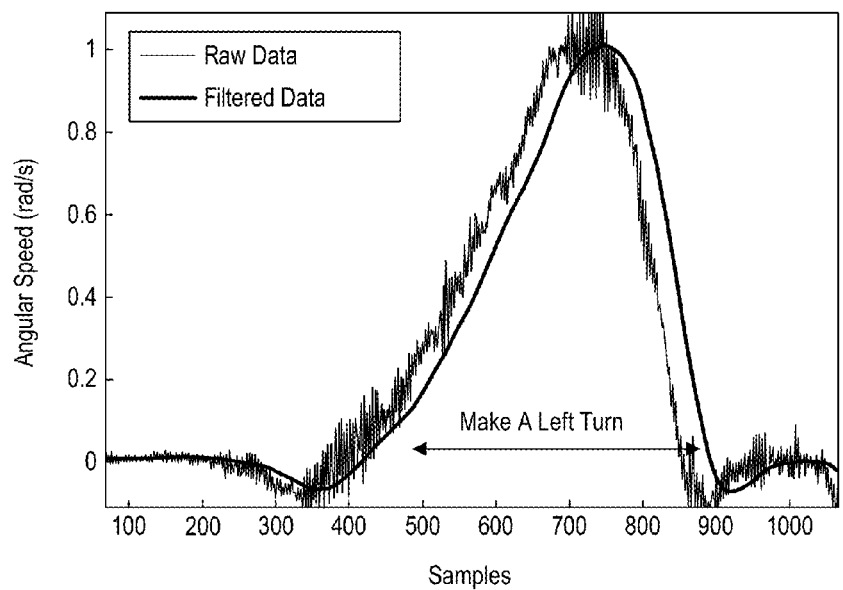
FIG. 3A-3D are graphs showing gyroscope readings when the vehicle makes a left turn, a right turn, a left lane change and a right lane change, respectively.
Figure 3B:
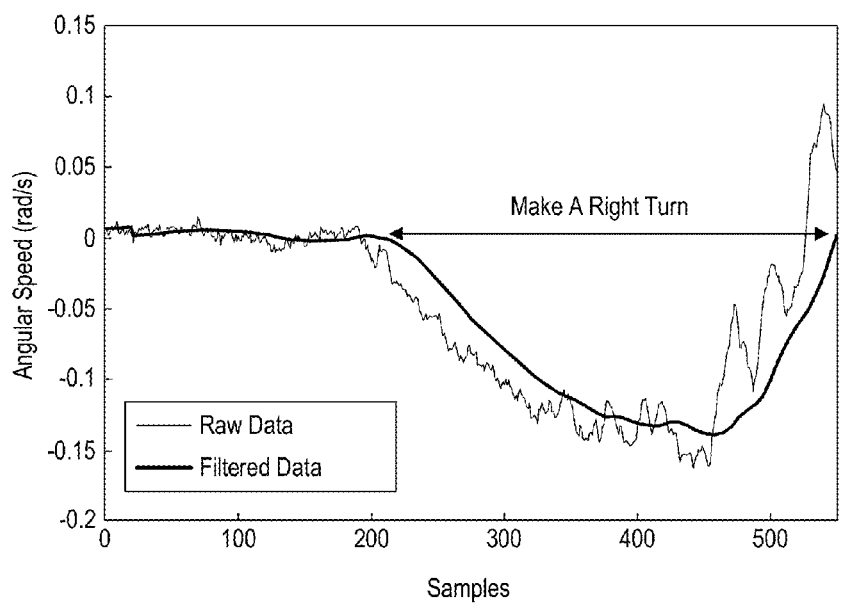
Figure 3C:
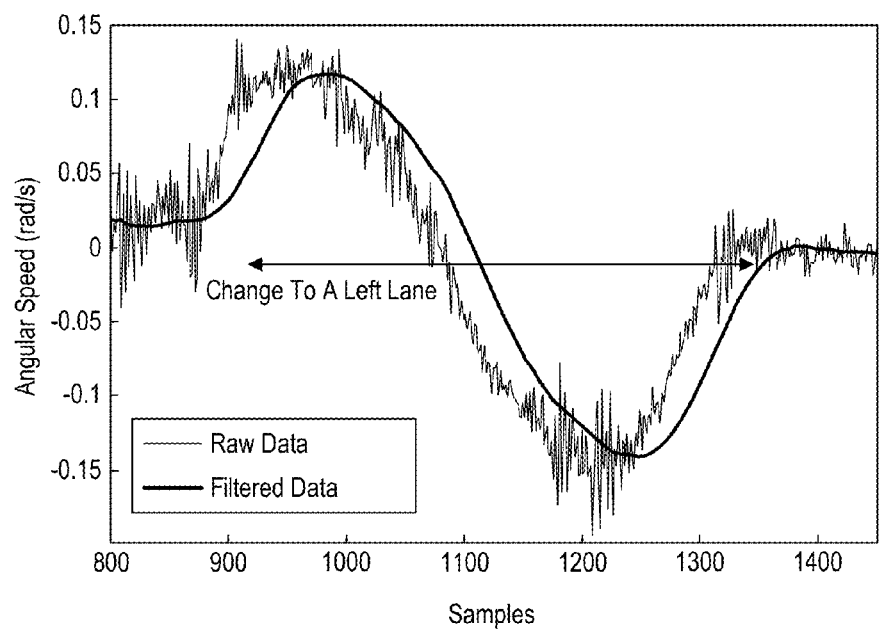
Figure 3D:
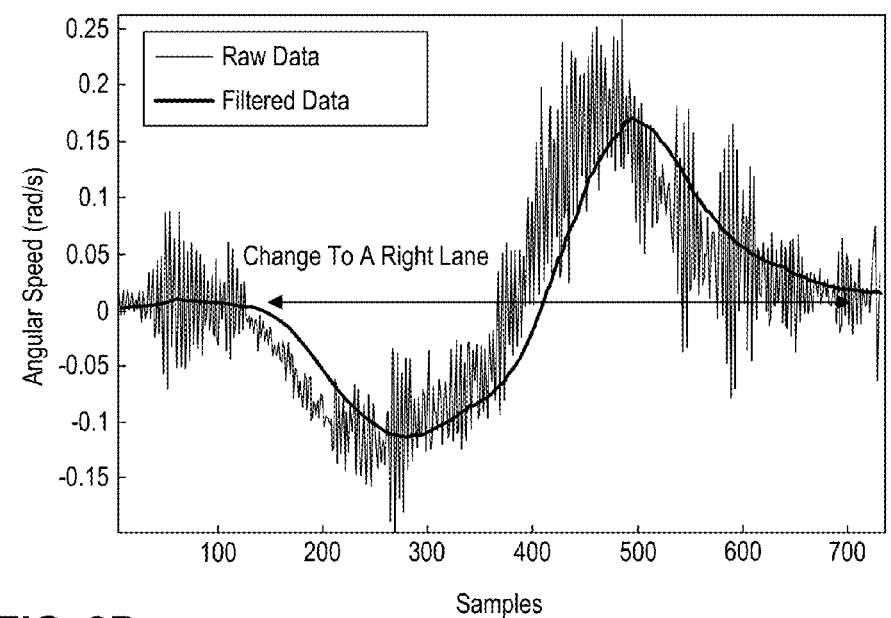

A detection signal is derived at 13 from the signals received from the inertial sensors. The detection signal is indicative of angular speed of the vehicle about a vertical axis of a geographic coordinate system, where the geographic coordinate system includes a vertical axis defined in relation to surface the vehicle is traversing upon. In most instances, the vertical axis of the geographic coordinate system will not align with any of the axes that define the phone coordinate system. FIG. 2 illustrates one technique for aligning the phone coordinates ($\{X_p, Y_p, Z_p\}$), with the geo-frame coordinates ($\{X_e, Y_e, Z_e\}$). This allows one to simplify the change of the readings from three degrees of freedom (DoFs) to one DoF. The key idea is that with the measurements of the direction of the applied gravity to the mobile phone (Y), the phone coordinate can be fixed within a cone. Combining the result with the angle (θ) derived from the magnetometer readings and the thus-determined rotation matrix, the phone coordinate can be aligned with the geo-frame coordinate. Further details regarding this example technique are described by P. Zhou et al in "Use it free: Instantly knowing your phone attitude" In *Proc of ACM Mobicom* (2014). Other alignment techniques also fall within the scope of this disclosure.

When a car changes its direction via steering (e.g., changing lanes, making turns, or driving on curvy roads), the Z-axis gyroscope reading (i.e., yaw rate reading) on the phone can be utilized to represent the vehicle angular speed of that change of direction. FIGS. 3A-3D illustrates the Z-axis gyroscope measurements from the phone during a left turn, a right turn, a change to left lane and a change to right lane, respectively. During a left turn, a counter-clockwise rotation around the Z-axis occurs and thus generates positive readings (i.e., a positive bump); whereas, during a right turn, a clockwise rotation occurs and thus generates negative readings (i.e., a negative bump). Similarly, during a left lane change, a positive bump is followed by a negative bump; whereas, during a right lane change, the opposite occurs. Based on this observation, one can infer that by detecting bumps in the Z-axis gyroscope readings, a determination can be made as to whether the vehicle has made a turn or has changed a lane. That is, the angular speed signal can be correlated at 14 to one of a plurality of predefined signatures, such that each signature represents a different maneuver made by the vehicle, and a vehicle maneuver is identified at 17 based on the correlation of the angular speed signal with one of the predefined signatures.

Figure 4A:
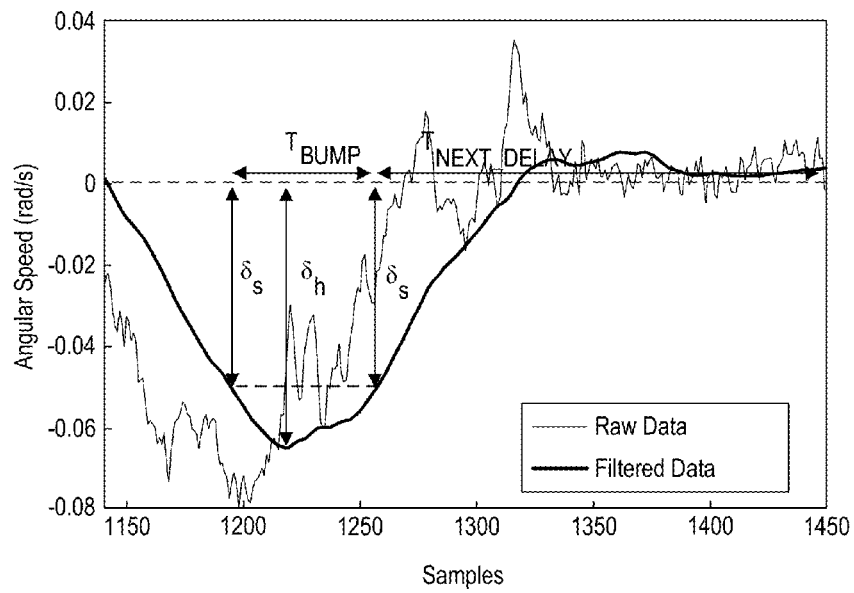
FIGS. 4A and 4B are graphs showing statistical features of bumps in gyroscope readings during different steering maneuvers.
Figure 4B:
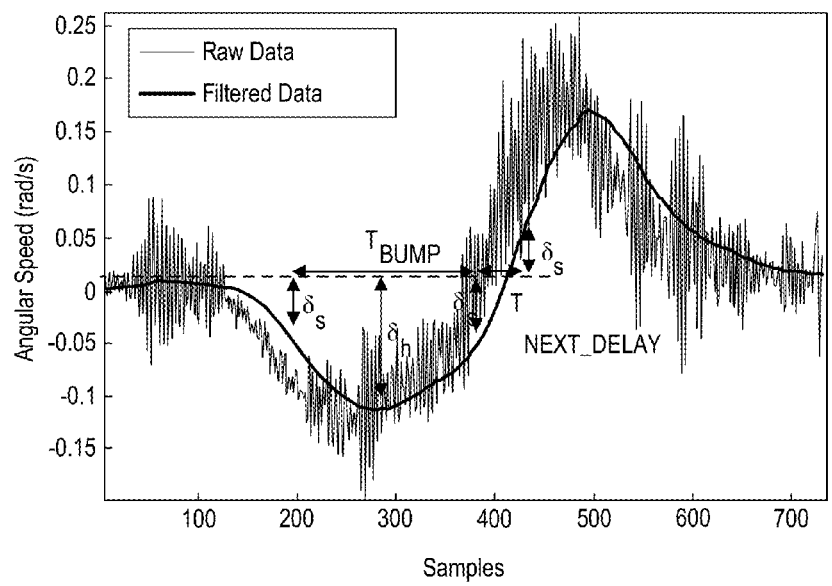

With reference to FIG. 4, an example embodiment for detecting bumps in the angular speed signal is further described. A moving average filter may be used to remove noise from the raw gyroscope readings. In the example embodiment, the delay parameter of the filter is set to 60 samples which correspond to 0.05 second in the time domain. Such a decision was made based on the experimental observation: it is short but good enough to extract the waveform of the bumps.

Four systems parameters are defined: $\delta_s$, $\delta_h$, $T_{BUMP}$, and $T_{NEXT\_DELAY}$. $\delta_s$ represents starting point or ending point for a bump, $\delta_h$ represents height of a bump, $T_{BUMP}$ represents minimum duration for a bump and $T_{NEX\_TDELAY}$ represents the maximum waiting time for a second bump in case of a lane change. To reduce false positives and differentiate the bumps from jitters, a bump should satisfy the following three constraints for its validity: (1) all the readings during a bump should be larger than $\delta_s$, (2) the largest value of a bump should be no less than $\delta_h$, and (3) the duration of a bump should be no less than $T_{BUMP}$. Based on these constraints of a valid bump, an example bump detection algorithm is set forth below.

```
 1: Inputs:
        State, Y (Yaw rate), System parameters
 2: if State = No-Bump and |Y| > δ_s then
 3:     (Start of 1^st bump)
 4:     State ← One-Bump
 5:     Record the start point of a possible bump
 6: else if State = One-Bump and |Y| > δ_s then
 7:     Record the end point of a possible bump
 8:     if bump is valid then
 9:         State ← Waiting-for-Bump
10:     else
11:         State ← No-Bump
12:     end if
13: else if State = Waiting-for-Bump then
14:     T_dwell ← State dwell duration
15:     If T_dwell < T_NEXT_DELAY and |Y| > δ_s then
16:         (Start of 2^nd bump)
17:         If 2^nd bump is valid then
18:             Two valid bumps → "Lane change"
19:         else
20:             One valid bump → "Turn"
21:         end if
22:         State ← No-Bump
23:     else if T_dwell < T_NEXT_DELAY then
24:         One valid bump → Turn
25:         State ← No-Bump
26:     else
27:         Continue in Waiting-for-Bump state
28:     end if
29: else
30:     Continue in current state
31: end if
```

In this bump detection algorithm there are three states: No-Bump, One-Bump and Waiting-for-Bump. Each of these states is described below.

In No-Bump state, the Z-axis gyroscope readings, i.e., yaw rate are continuously monitored. When the absolute value of the measured yaw rate reaches $\delta_s$, this is interpreted as the start of a possible bump and the algorithm enters One-Bump state.

The One-Bump state terminates when the yaw rate drops back to a value below $\delta_s$. If the sojourn/dwell time in One-Bump state was larger than $T_{BUMP}$ and the largest measured yaw rate was larger than $\delta_h$, hence satisfying the three constraints, the first detected bump is considered to be valid. In such a case, the algorithm enters Waiting-for-Bump state; otherwise, it returns to No-Bump.

In Waiting-for-Bump state, the yaw rate readings are monitored for a maximum dwell time $T_{NEXT\_DELAY}$. The yaw rate readings are monitored for the presence of a second bump. If another bump starts (i.e., the yaw rate reaching $\delta_s$ with a sign opposite to the first bump's is detected), then the validation procedure for a bump is performed as described above. If the second bump is valid, this would mean that two consecutive bumps with opposite signs have been detected. In this case, the algorithm determines the maneuver to be a lane change. If the second bump turns out to be invalid, then it would mean that only a single valid bump was detected and thus the algorithm determines the maneuver to be a turn. In either case, after a determination has been made, the state is reset (at line 22) to the No-Bump state. This process is repeated (at line 27) so long as the dwell time is less than the maximum dwell time $T_{NEXT\_DELAY}$. Once the dwell time exceeds the maximum dwell time $T_{NEXT\_DELAY}$, the algorithm return to the No-Bump state. The bump-detection algorithm is executed iteratively for each collected sample, and goes through a different procedure depending on the current state.

With large values of $\delta_h$ and $\delta_s$, small bumps—which may be caused by background noise or sensing errors—can be ignored and thus reduce the false-positive rate, whereas the false-negative rate might increase. On the other hand, with small values of $\delta_h$ and $\delta_s$, the false-negative rate can be reduced but will become susceptible to background noise, thus increasing the false-positive rate. From extensive road tests, it was found that parameters $\delta_s$=0.05 and $\delta_h$=0.07 represent a good tradeoff. In an example embodiment, these parameters values are used although other values may be suitable. For example, the optimal parameter setting may vary slightly with the driving habit. It is envisioned that an adaptive parameter selection mechanism may be used as well. As for the other two parameters, $T_{BUMP}$ represents the time duration of a valid bump; whereas, $T_{NEXT\_DELAY}$ represents the maximum waiting time for the following bump, in case of a lane change. Since the time duration of a turn or lane change is usually several seconds, $T_{BUMP}$ is set to 1.5 seconds and $T_{NEXT\_DELAY}$ is set to 3 seconds in the example embodiment. It is readily understood that these values may be varied within the scope of this disclosure.

When the vehicle is steered, bumps in the yaw rate readings are constructed. Based on the bump detection algorithm, bumps are used to differentiate between turns and lane changes. One possible problem with this approach is when driving on a curvy road. As illustrated in FIG. 5, when driving on a curvy road, the vehicle trajectory is similar to a lane change or a turn, and hence resulting in the same number and shape of bumps. In such a case, the bump detection algorithm might misinterpret the drive on a curvy road as a lane change or turn, and thereby yield false positives/negatives. Therefore, it is imperative to differentiate between lane changes, turns, and also driving on curvy roads.

To address this issue, vehicle maneuvers are also classified based on magnitude of horizontal displacement of the vehicle relative to the direction of travel. Let $W_{LANE}$ denote the horizontal displacement after a lane change. Since the average lane width is around 3.65 meters, $W_{LANE}$ is expected to be around that value after a lane change. In contrast, while driving on a curvy road, the horizontal displacement, denoted as $W_{CURVY}$, is usually much larger than $W_{LANE}$. Based on this observation, if two bumps are detected—which means a possible lane change—then horizontal displacement of the vehicle during that steering maneuver is also evaluated. If horizontal displacement exceeds a threshold correlated to the average lane width (e.g., 3.65 meters), then the vehicle maneuver is classified as a curvy road instead of a lane change.

Similarly, horizontal displacement can be used to differentiate between turns at the intersection (i.e., a sharp turn) and driving on a curvy road. Horizontal displacement during a turn is much smaller than that during driving on a curvy road. FIGS. 5C and 5D illustrate this point, where $W_{TURN}$ and $W_{CURVY}$ represent the horizontal displacements during a turn and driving on a curvy road, respectively. In this case, if only one bump is detected, horizontal displacement is used to distinguish between turning and driving on a curvy road.

Figure 5A:
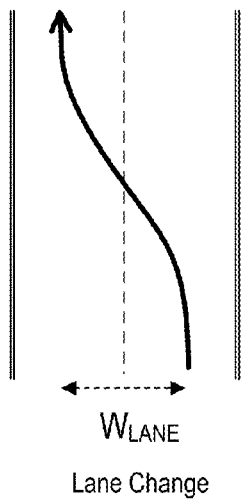
FIGS. 5A-5D are diagrams showing the vehicle trajectory shape for four different scenarios: (a) lane change, (b) driving on an S-shaped curvy road, (c) turning, and (d) driving on an L-shaped curvy road.
Figure 5B:
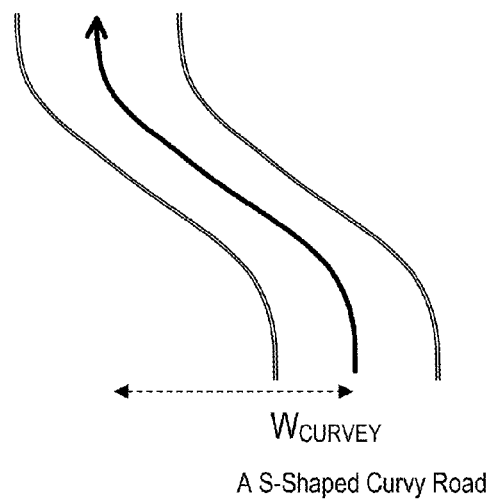
Figure 5C:
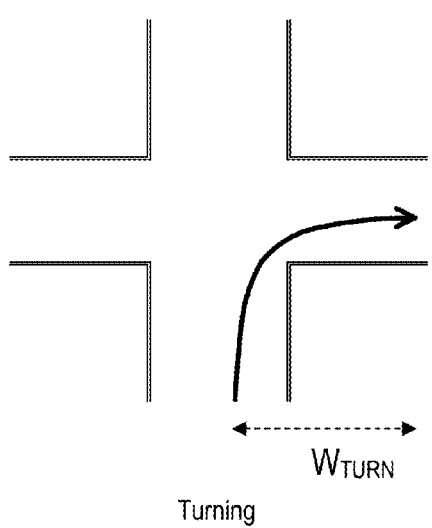
Figure 5D:
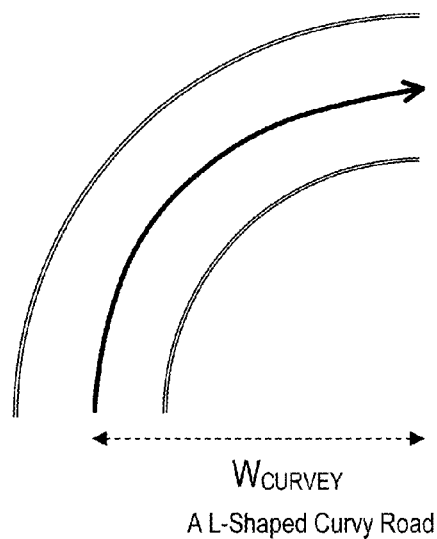
Figure 6:
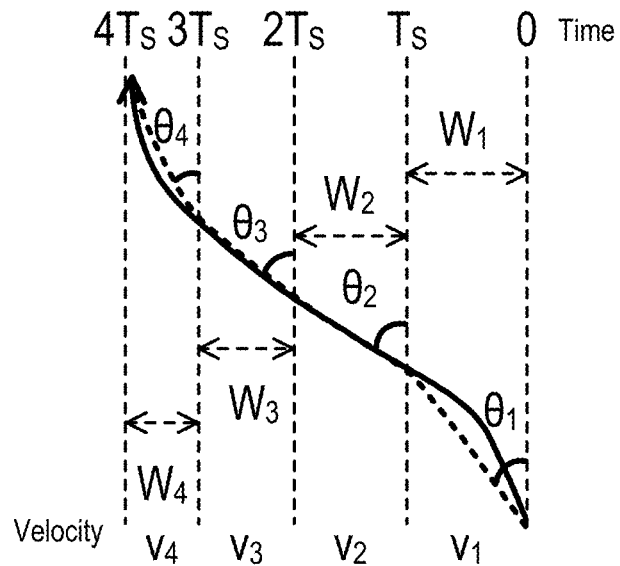
FIG. 6 is a diagram depicting how to derive horizontal displacement based on gyroscope readings and estimated velocity.

FIG. 6 shows an example vehicle trajectory during a left lane change or maneuver on a curvy road as illustrated in FIGS. 5A and 5B. The dotted vertical line represents the time when the sensors are sampled with frequency of $1/T_s$. Here $\theta_n$ denotes the angle of the vehicle's heading; whereas $v_n$ represents the average velocity during the sampling period. During each sampling period, $T_s$, the vehicle's horizontal displacement can be expressed as:

$$W_n = v_n T_s \sin(\theta_n) \quad (1)$$

Since the yaw-rate readings from the gyroscope represent the vehicle's angular velocity around the Z-axis, $\theta_n$ can be expressed as:

$$\theta_n = \theta_{n-1} + Y_{avg} T_s \quad (2)$$
$$\approx \theta_{n-1} + Y_n T_s,$$

where $Y_{avg}$ represents the average yaw rate during the sampling period, and $Y_n$ the instantaneous yaw rate measured at the end of the sampling period. Note that the above approximation holds since the sampling period on smartphones can be significantly reduced. Thus, the total horizontal displacement from time 0 to $NT_s$ can be derived as:

$$W_{final} = \sum_{n=1}^{N} W_n \quad (3)$$
$$= \sum_{n=1}^{N} v_n T_s \sin(\theta_n)$$
$$= \sum_{n=1}^{N} v_n T_s \sin\left(\sum_{k=1}^{n} Y_k T_s\right)$$

where $T_s$ is a predefined parameter denoting the sampling period of the application. The third equality comes from the fact that the initial angle of the vehicle's heading, $\theta_0=0$, since this is the reference point. $Y_k$ can be acquired from the gyroscope readings, while $v_n$ can be derived from the accelerometer and GPS readings. Other techniques for determining horizontal displacement also fall within the broader aspects of this disclosure.

To further classify different turning maneuvers (e.g., left/right turn at the intersections, U-turn), the change in the vehicle's heading angle (i.e., the difference in the heading angle between the start and the end of a steering maneuver) may also be evaluated. As in Eq. (2), the angle of vehicle's heading at sampling time $nT_s$ can be derived by accumulating the n yaw-rate measurements. Considering the example in FIG. 6, at sampling time $3T_s$, the angle of the vehicle's heading would be $\theta_3 = \sum_{n=1}^{3} Y_n T_s$. In other words, the change in the vehicle's heading from time 0 to $NT_s$ can be expressed as:

$$\theta_{final} = \sum_{n=1}^{N} Y_n T_s. \quad (4)$$

For example, after making a left/right turn at the intersection, $\theta_{final} \approx \pm 90°$; whereas, after making a U-turn, $\theta_{final} \approx \pm 180°$. Thus, by exploiting the derived values, turns can be further classified as left/right turn or a U-turn.

Returning to FIG. 1, the bump detection algorithm is one way that an angular speed signal can be correlated to one of a plurality of predefined signatures at 14. Other techniques for correlating also fall within the scope of this disclosure. Next, a direction of travel for the vehicle is determined at 15 and horizontal displacement of the vehicle is determined at 16. A maneuver being made by the vehicle can then be identified at 17 based on the correlation of the angular speed signal to one of the predefined signatures (i.e., number of bumps) and the magnitude of the horizontal displacement of the vehicle. It is to be understood that only the relevant steps of the proposed V-Sense technique are discussed in relation to FIG. 1, but that other software-implemented instructions may be needed to control and manage the overall operation of the system.

Figure 7:
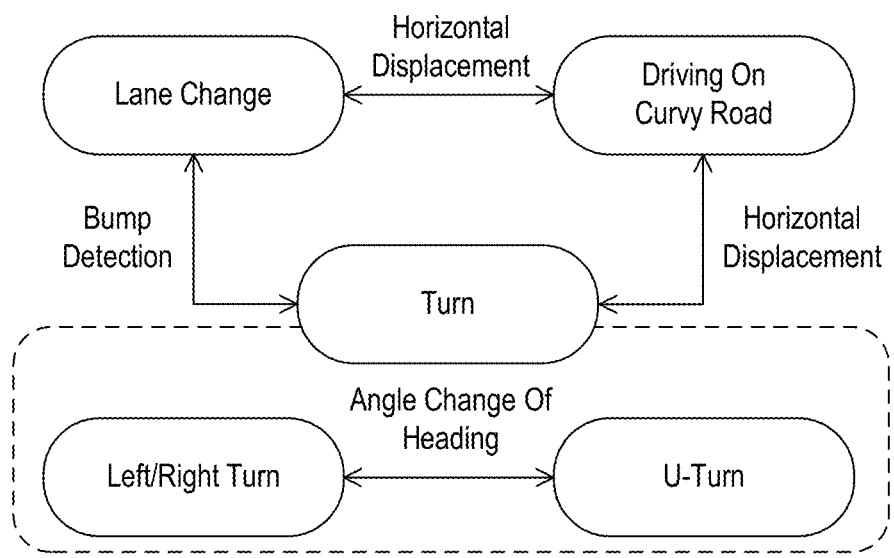
FIG. 7 is a state diagram of maneuver classification in accordance with this disclosure.

FIG. 7 summarizes the overall maneuver classification in a state diagram. First, a determination is made as to whether the steering maneuver is a possible turn or a possible lane change, for example by calculating the number of bumps using the bump detection algorithm described above. In either case, horizontal displacement of the vehicle is also determined to help differentiate between a turn or lane change from driving on a curvy road.

For a possible lane change, the magnitude of the horizontal displacement is compared to a first threshold that correlates to expected lane width (e.g., 3.65 meters). If the magnitude of the horizontal displacement exceeds the first threshold, the steering maneuver is classified as a curvy road; whereas, if the magnitude of the horizontal displacement is less than (or equal to) the first threshold, the steering maneuver is classified as a lane change.

For a possible turn, the magnitude of the horizontal displacement is again compared to a threshold but the value of the threshold depends on the turn direction. For a possible right hand turn, the magnitude of the horizontal displacement is compared to right turn threshold (e.g., 13 meters). If the magnitude of the horizontal displacement exceeds the right turn threshold, the steering maneuver is classified as driving on a curvy road; whereas, if the magnitude of the horizontal displacement is less than (or equal to) the right turn threshold, the steering maneuver is classified as a right turn. On the other hand, for a possible left hand turn, the magnitude of the horizontal displacement is compared to left turn threshold (e.g., 22 meters). If the magnitude of the horizontal displacement exceeds the left turn threshold, the steering maneuver is classified as driving on a curvy road; whereas, if the magnitude of the horizontal displacement is less than (or equal to) the left turn threshold, the steering maneuver is classified as a left turn. Turns may also be further classified as U-turns based on the change in the vehicle's heading angle. Other techniques for classifying vehicle maneuvers are contemplated and fall within the broader aspects of this disclosure.

Figure 8:
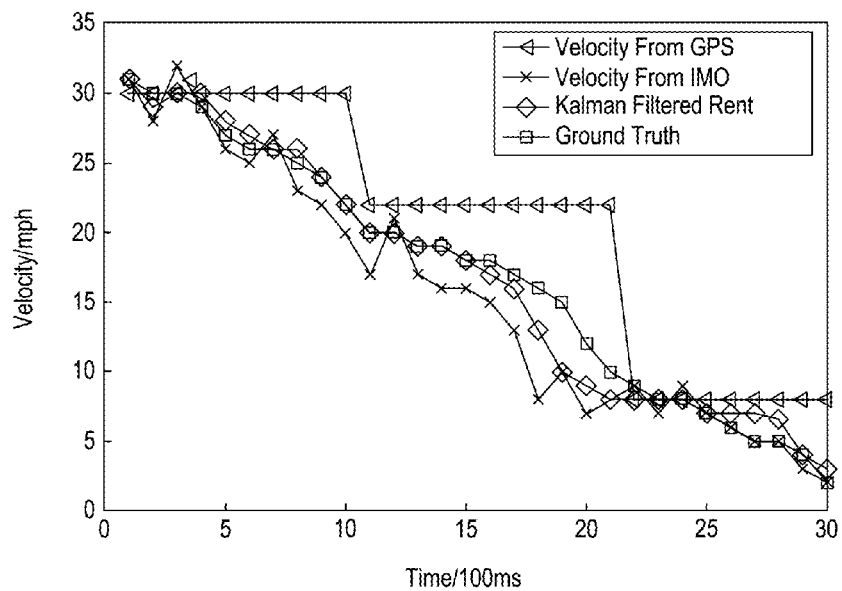
FIG. 8 is a graph showing the accuracy of velocity estimation by fusing sensor readings.

In order to derive the horizontal displacement and set $T_{BUMP}$ and $T_{NEXT\ DELAY}$, accurate measurements are needed for the vehicle's instantaneous velocity. Two possible ways of acquiring the velocity with a mobile phone are: reading the Speed Over Ground (SOG) output from the GPS module inside the smartphone, or exploiting the IMU. The GPS provides measurements of the velocity; whereas, acceleration can be derived from IMU readings. However, the GPS output rate is very low (e.g., 1 Hz on Samsung Galaxy S4) as shown in FIG. 8, and hence cannot properly capture velocity changes within a sampling period. On the other hand, the IMU has a much higher output rate but contains lots of noise as well as some biases as shown in FIG. 8. Thus, just simply using either the velocity measurement from GPS or taking an integral of the acceleration output from the IMU is not sufficient. Hence, in order to exploit the distinct advantages of GPS and IMU, the data is fused by using a Kalman filter to estimate the velocity.

In one embodiment, a model is constructed for estimating the velocity as follows:

$$v(k|k-1)=v(k-1|k-1)+(a(k)-b(k-1|k-1))T_s \quad (5)$$

where $v(k|k-1)$ is the estimated velocity at time k based on the optimized velocity at time k−1; $v(k-1|k-1)$ is the optimized velocity at time k−1; $a(k)$ is the acceleration output at time k; $b(k-1|k-1)$ is the optimized bias of the accelerometer at time k−1; and $T_s$ is the sampling period of the accelerometer.

Here, b is treated as a constant bias:

$$b(k|k-1)=b(k-1|k-1) \quad (6)$$

Thus, we have a matrix representation of the model as:

$$X(k|k-1)=AX(k-1|k-1)+BU(k) \quad (7)$$

where $$X = \begin{bmatrix} v \\ b \end{bmatrix},$$

$$A = \begin{bmatrix} 1 & -T_s \\ 0 & 1 \end{bmatrix},$$

$$B = \begin{bmatrix} T_s \\ 0 \end{bmatrix},$$

and U is the output from accelerometer. So, the covariance matrix is estimated by:

$$P(k|k-1) = APA^T + Q, \quad (8)$$

$$Q = \begin{bmatrix} q_v & 0 \\ 0 & q_a \end{bmatrix}$$

where P is the covariance matrix, and Q is the covariance of the process noise which can be regarded as the Gaussian white noise. Thus, the state can be estimated as:

$$X(k|k)=X(k|k-1)+g(k)(S(k)-HX(k|k-1)) \quad (9)$$

where $g(k)$ is the matrix of Kalman gain and $S(k)$ is the speed relative to the ground measured by the GPS, and H=[1 0].

FIG. 8 shows velocity estimation by using such a model based on Kalman Filter. Here the ground truth velocity is obtained by directly reading it from the OBD-II port, and comparing it with estimation results. It is shown that the velocity can be accurately estimated in real time, thus yielding accurate horizontal displacements.

To evaluate the performance of V-Sense technique described above, middleware performing the technique was implemented on a Samsung Galaxy S4 with a 1.6 GHz quad-core processor running Android 4.4.1 KitKat OS and tested in variety of different conditions. First, the accuracy of the V-Sense technique was evaluated in determining the change of heading angle and the horizontal displacement in a short road test. Then, the performance of classification was evaluated with a longer road test containing various road features. The cars used for the test were a 2010 Mitsubishi Lancer and a 2006 Mazda 6. During these experiments, the mobile phone was either mounted on the windshield, or kept in the driver's pocket.

By making several lane changes, turns and U-turns during a short road test, the accuracy of V-Sense technique in estimating the change of heading angle and the horizontal displacement was evaluated. During the road test, three lane changes were made (i.e., one to the left lane and the other two to the right lane) and three U-turns. The horizontal displacements and changes of heading angle were collected to check whether the estimated values are close to their ground truth. The results of the two separate tests are summarized in Table 1. For consistency, all numbers are presented as their absolute values.

TABLE 1

|  | Lane Change | | | | U-turn | | | |
| --- | --- | --- | --- | --- | --- | --- | --- | --- |
|  | #1 | #2 | #3 | Average | #1 | #2 | #3 | Average |
| Displacement [m] | 4.29 | 3.49 | 3.59 | 3.79 | 14.47 | 15.66 | 14.46 | 14.86 |
| Angle Change [deg] | 2.03 | 7.49 | 4.12 | 4.54 | 193.73 | 179.85 | 184.41 | 185.99 |

During a lane change, the ground truth horizontal displacement is expected to be equal to the actual lane width, which was around 3.7 m for our experiment. However, for the change of heading angle, it is expected to be 0°, since this is a measure of the difference between the initial and the final heading angles.

On the other hand, during a U-turn, the ground truth of horizontal displacement and the change of heading angle are the road width for U-turns, which was approximately 16 m in our case, and 180°, respectively.

Figure 9:
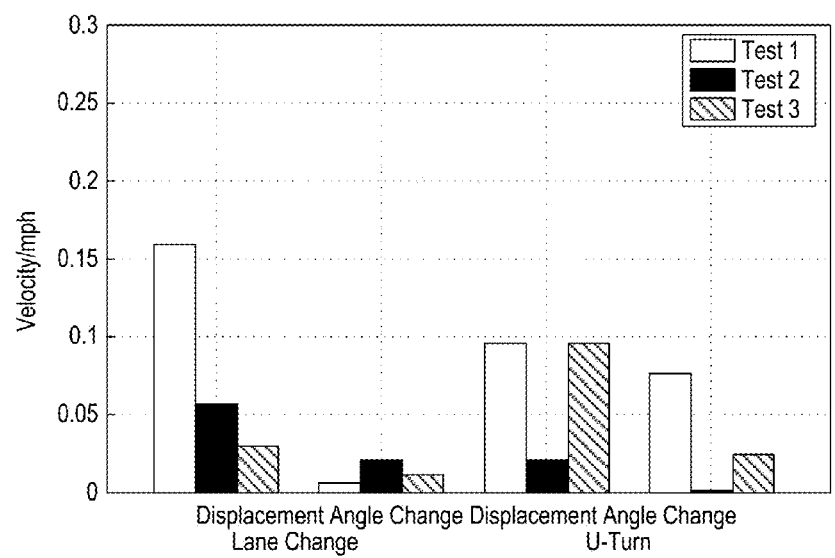
FIG. 9 is a graph showing error of values determined by the proposed technique as compared with the ground truth.

FIG. 9 shows the error ratio—which is the ratio of the absolute deviation to the ground truth value—in the two experiments. For all cases, the estimated horizontal displacement and change of heading angle have a very low error ratio, i.e., very accurate. The high accuracy of the V-Sense technique in determining the two values means that it can correctly classify various steering maneuvers, which is validated in the following subsection by conducting long road tests.

Figure 10A:
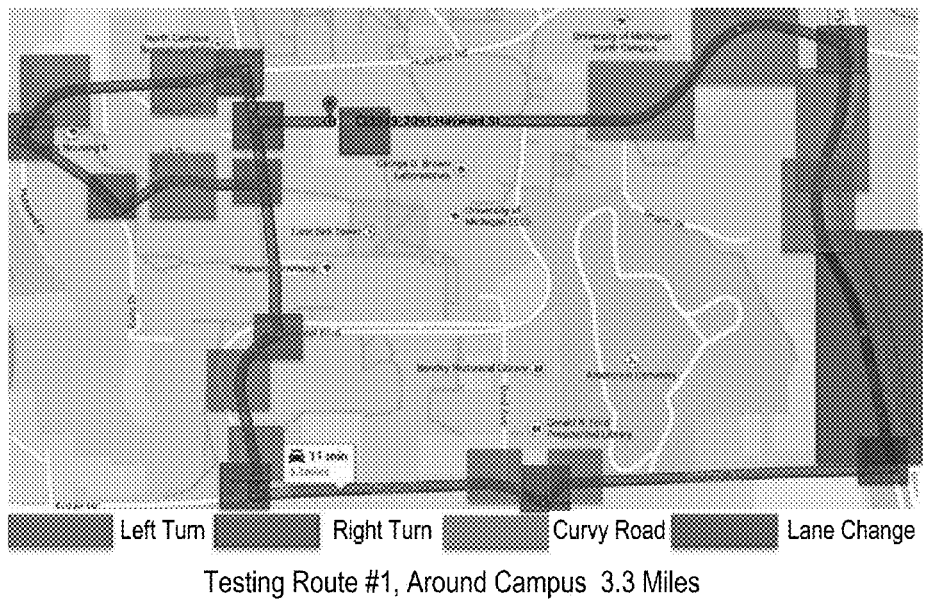
FIGS. 10A and 10B are diagrams showing real road testing routes used for evaluation in Ann Arbor, Mich.
Figure 10B:
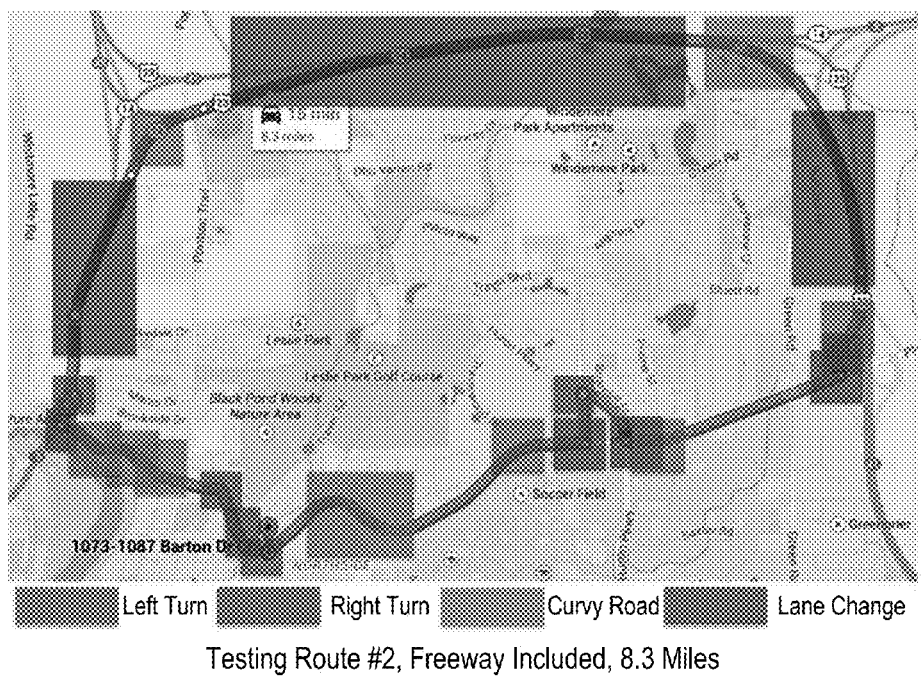

To evaluate how well the V-Sense technique classifies different steering maneuvers, two long road tests were also performed. To guarantee the generality of the experiment, two different test routes were chosen as shown in FIGS. 10A and 10B. The routes run through typical urban areas and freeways, the former including residential, downtown, and school areas. The number of features in the examined routes is summarized in Table 2.

TABLE 2

Summary of different road features in testing routes.

| Route | Distance [miles] | RT | LT | LC | CR |
| --- | --- | --- | --- | --- | --- |
| #1 | 3.4 | 6 | 5 | 4 | 11 |
| #2 | 8.3 | 5 | 5 | 15 | 9 |

To validate the independence of the V-Sense technique from driving habits, we had five volunteers participating in the test, three male drivers and two female drivers. Each of them drove twice on both route #1 and #2. In the first test, they mounted the phone on the windshield; whereas, in the second test, the phone was kept inside the driver's pocket.

Figure 11:
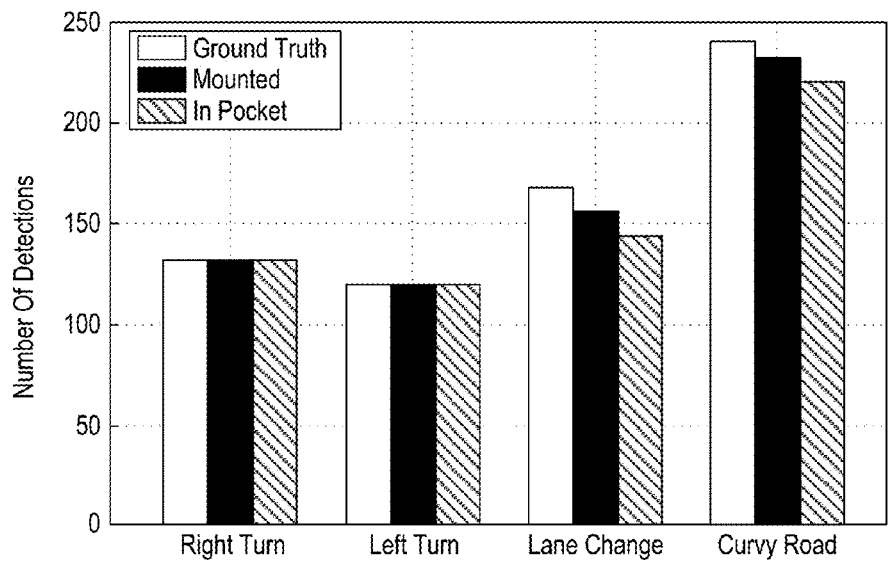
FIG. 11 is a bar chart showing performance of recognizing different steering patterns on both test routes.

With reference to FIG. 11, the on-road experimental results can be highlighted as follows. V-Sense technique achieves 100% accuracy in detecting both right and left turns, regardless of the phone's placement and road condition. This is because when turning, the heights of the bumps in the readings tend to be high enough to be accurately detected and classified. For lane changes, V-Sense technique achieves 93% accuracy when the phone is mounted on the windshield, and 85% accuracy when the phone is in the driver's pocket. The false-negative results are mostly due to the fact that the V-Sense technique occasionally misinterprets a lane change as driving on a curvy road, because a few of the lane changes in the test took longer than expected, especially on the freeway where drivers tend to take extra caution, thus making slower lane changes. The accumulated error in the gyroscope reading can also degrade the performance in such a case. However, its occurrence is expected to be rare considering the average elapsed time for lane changing, i.e., less than 6 seconds. Finally, the V-Sense technique achieves nearly 97% accuracy in detecting curvy roads with the phone mounted on the windshield, and nearly 92% accuracy with the phone kept in the driver's pocket. These results also reflect the accuracy of the coordinate alignment. Also, note that the V-Sense technique was able to detect the two long L-shaped curvy roads on the US #23 freeway using bump detection and horizontal displacement derivation.

In one application, the V-Sense technique can be used to detect careless steering: changing lanes or making turns without turning on the turn signal. Detecting a driver's careless steering is important, since it would enhance the safety of not only the driver but also people/vehicles around him. Moreover, it can also be used by insurance companies in monitoring the driver's driving habit and thus determining the insurance premium accordingly, which would then motivate the drivers to avoid careless steering.

Figure 12:
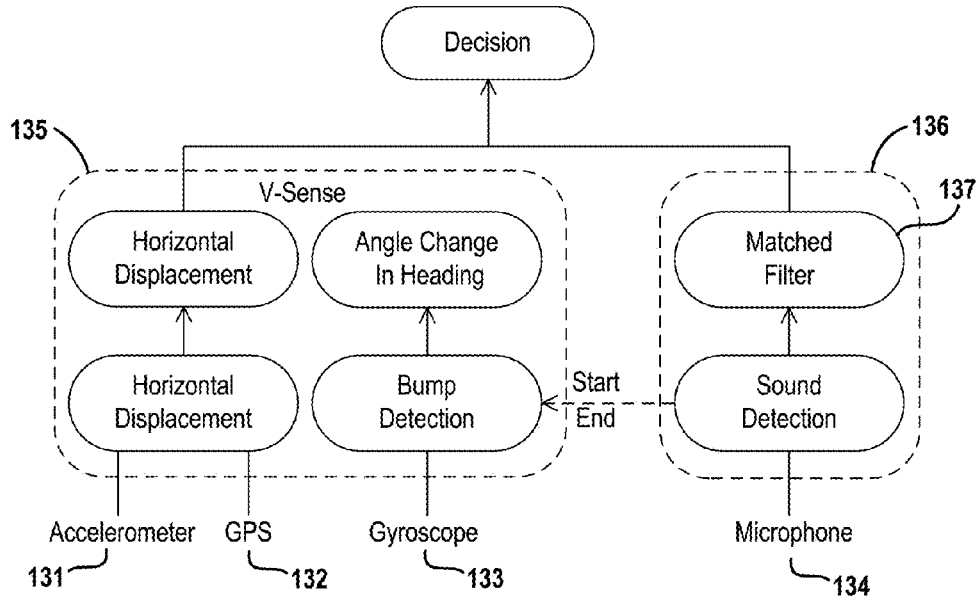
FIG. 12 is a diagram depicting information flow of careless steering detection by combining the V-Sense technique with a sound detection module.

FIG. 12 shows the information flow of careless steering detection using data collected from the accelerometer 131, GPS 132, gyroscope 133, and microphone 134 on a mobile phone. This application is comprised of the V-Sense module 135 as well as a sound detection module 136. The V-Sense module 135 detects possible lane changes or turns using the gyroscope readings in the manner set forth above. Upon detecting the start point of a lane change or turn (i.e., bump), the sound detection module 136 activates the microphone 134 and starts to detect the turn signal sound. If a lane change or turn is detected without the detection of signal sound, the application declares the driver is involved in careless driving, and triggers an alarm (visual, audible or otherwise) to notify the driver; otherwise, the application declares it as attentive driving.

In order to detect whether the driver has used the turn signal, the sound detection module 136 uses the following three steps: (i) collect training samples of the turn signal sound; (ii) eliminate background noise with a matched filter; (iii) make a decision on whether the turn signal was used during the turn or lane change.

Figure 13A:
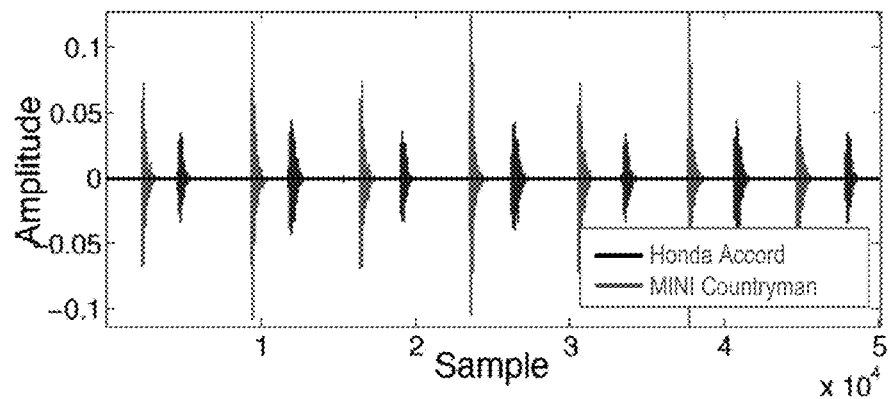
FIGS. 13A and 13B are graphs showing turn signal samples from a 2006 HONDA Accord and MINI Countryman; and the matched result from a matched filter with the existence of background noises inside the car, respectively.

First, the turn signal sounds are collected from two different cars, 2006 Honda Accord and MINI Countryman, which are used as sample data sets as shown in FIG. 13A. The measured steady rates of the turn signal in the 2006 Honda Accord and MINI Countryman were 161 and 163 ticks per second (shown in FIG. 16), respectively. As the turn signal sounds acquired from the 2006 Honda Accord has lower amplitude, and would thus be more difficult to detect, sound detection was studied using this data set. To test the performance of the turn signal detection module in real driving scenario, the engine was turned on and music was played which acts as background noise inside the car.

To detect the sound emitted from the turn signals, the detection module has to overcome two challenges: (i) it must be resilient to the variation of SNR due to unpredictable detection conditions; and (ii) the delay in detecting a single turn signal must be low in order to be ready for detecting the subsequent signal. A matched filter 137 was used to meet these challenges.

The matched filter 137 is used to detect the presence of a known signal in the unknown signals. The key idea behind the matched filter 137 is to design an impulse response that maximizes the output SNR. Due to unpredictable driving conditions, the noise inside the car cannot be easily modeled. Thus, the turn signal is modelled and the signal sound is extracted by using one convolution with the matched filter kernel. Since the turn (sound) signal can be modeled as series of discrete signals, we use the discrete version of matched filter, in which the output y[n], can be expressed as:

$$y[n] = \Sigma_{k=-\infty}^{\infty} h[n-k]h[k], \quad (10)$$

where the impulse response, h[n], of the matched filter is $$h[n] = g[n] \otimes v[n_o - n], \quad (11)$$

where g[n] denotes the power spectral density of background noise. The matched signal Matched is acquired by applying $$Result[n] = Signal[n] \otimes h[n], \quad (12)$$

where signal[n] is the sound recorded by the smartphone's microphone inside the car and Result[n] is the output of the matched filter.

If the amplitude of the matched filter output is larger than T, a pre-defined threshold set to 0.35 by default, the V-Sense technique declares the detection of a turn signal sound. If the detected turn signal is accompanied by a lane change or turn detected by the V-Sense technique, then the application declares the steering maneuver as being attentive. On the other hand, if no such turn signal sound was detected, the application declares the steering to be careless, and then alarms the driver.

Figure 13B:
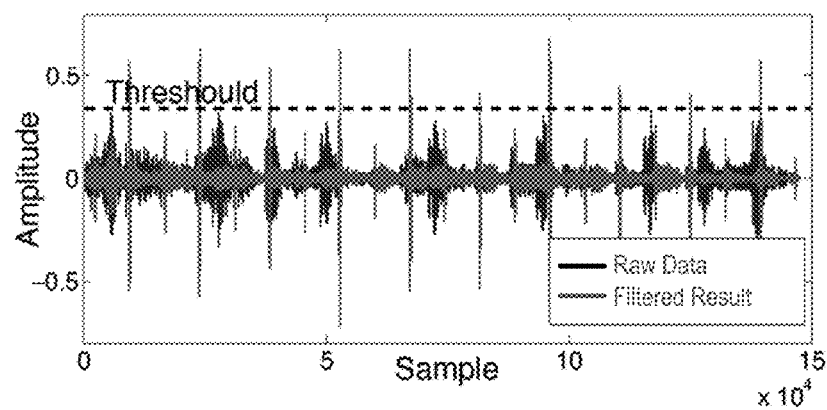

FIG. 13B shows the performance of the sound detection module which extracts signal sound from background noise. Experiments were conducted in a regular driving setting, where music played inside the car and the passengers were talking occasionally. The matched filter was able to extract and identify the sound of the turn signals from the background noise, even when the amplitude of the noise was very high (radio played music at the max volume). By integrating this accurate sound detection module with the V-Sense technique, the application detects careless steering and thus enhances driving safety significantly.

Fine-grained lane guidance allows existing navigation systems provide higher guidance accuracy. Specifically, fine-grained lane guidance detects whether the driver is in the correct lane and alarms the driver if not. Existing navigation systems on mobile phones are constrained by the accuracy of the built-in GPS sensor, which is at best 5~10 m. When the line-of-sight transmission between the satellite and the phone is blocked by obstacles, such as tunnels, bridges, and tall buildings, the accuracy quickly drops to 20~100 m. Such limitations make it impossible for legacy navigation systems to recognize the exact traffic lane that the vehicle is on. The latest update of Google Maps does include a lane guidance function, but in a rather limited way: it can only provide information on which lane the vehicle should stay, not whether it is actually on that lane. Fine-grained lane guidance is important, since it can reduce abrupt lane changes, and also very helpful for drivers who have lack driving experience.

Based on information from an on-line map, the correct lane for the next maneuver can be easily determined, which is a function already provided by existing navigation systems. Hence, the main challenge of realizing the fine-grained lane guidance application is the determination of the current lane that the vehicle is running on. To meet this challenge, one needs to determine the vehicle's current lane via lane change detection. The current lane can be determined based on whether and how the vehicle has changed its lane. Thus, by detecting and analyzing the lane changes made by the vehicle, one can determine the vehicle's current lane.

Lane changes may take place in two situations: (i) middle of a road or; (ii) at intersections. For the first case, the V-Sense technique can reliably detect lane changes on the road using techniques described above. For the second case, an add-on module 161 (called InterHelper) was developed for the V-Sense module 135. In FIG. 14, the navigation system 162 and the V-Sense module 135 cooperate to determine the fine-grained location. The navigation system is capable for determining whether the vehicle is at the intersection. Once the vehicle reaches an intersection, the InterHelper module 161 is triggered and starts to estimate the turning radius, $R_i$. Note that $R_i$ is equivalent to the horizontal displacement during the turn, which can be derived by using the techniques described above. This information enables the V-Sense module 135 to finally determine the fine-grained location.

As shown in FIG. 15, there are four possibilities of lane change at a typical 4-lane single carriageway intersection. That is, each car has two choices of making either right or left turn. Here, it is assumed that the turning trajectory is an arc, which is a common assumption in intersection design. $O_1, O_2, O_3, O_4$ are centers of turning circles. InterHelper module 161 classifies each case by differentiating the turning radius, i.e., $R_1, R_2, R_3, R_4$.

For a typical intersection, the right turn radius, $R_1$ is 10.8 m, the left turn radius, $R_3$ is 20.7 m, and the width of a typical intersection is 19.2 m. Moreover, the lane width is around 3.65. Based on these facts and extensive road experiments, the threshold for differentiating $R_1$ and $R_2$ are set as 13.1 m, and the threshold of differentiating $R_3$ and $R_4$ are set as 21.64 m. Using such thresholds and the horizontal displacement obtained from the V-Sense module, the application determines whether the vehicle has changed its lane during a turn at the intersection.

In order to evaluate the performance of the fine-grained lane guidance application, 80 left and right turns were performed at different intersections in Ann Arbor, Mich., U.S., and the results are shown in FIG. 16. The application is shown to be able to detect 95% of right turns with $R_1$, 90% with $R_2$, 90% of left turns with $R_3$ and 85% with $R_4$. It can therefore be concluded that by integrating InterHelper into V-Sense, the application is capable of detecting lane changes in all cases, thus determining the vehicle's current lane.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD- ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for detecting vehicle maneuvers using a mobile phone residing in the vehicle, comprising:
    receiving, by a processor of the mobile phone, signals from two or more sensors residing in the mobile phone while the vehicle is moving, where the signals are indicative of vehicle movement and reported relative to a coordinate system associated with the mobile phone;
    converting, by the processor, the signals from the two or more sensors from the phone coordinate system to a geographic coordinate system;
    deriving, by the processor, a detection signal indicative of angular speed of the vehicle about a vertical axis of the geographic coordinate system, where the detection signal is derived from the converted signals;
    correlating, by the processor, the detection signal to one of a plurality of predefined signatures, where each signature represents a different maneuver made by a vehicle;
    determining, by the processor, a direction of travel for the vehicle;
    determining, by the processor, a horizontal displacement of the vehicle relative to the direction of travel; and
    identifying, by the processor, a maneuver made by the vehicle based on the correlation of the detected signal to one of the plurality of predefined signatures and magnitude of the horizontal displacement of the vehicle.

2. The method of claim 1 further comprises aligning the phone coordinate system with the geographic coordinate system prior to the step of receiving signals.

3. The method of claim 1 wherein the geographic coordinate system includes a vertical axis defined in relation to surface the vehicle is traversing upon and the vertical axis does not align with any of the axes that define the phone coordinate system.

4. The method of claim 1 wherein correlating the detection signal to one of a plurality of predefined signatures further comprises identifying one or two bumps in the detection signal, where one bump correlates to turn by the vehicle and two bumps correlates to a lane change by the vehicle.

5. The method of claim 1 wherein identifying a maneuver made by the vehicle further comprises classifying a vehicle maneuver into one of three classes selected from a group consisting of lane change, turn and curvy road.

6. The method of claim 1 wherein identifying a maneuver made by a vehicle further comprises
    comparing magnitude of the horizontal displacement to a threshold; and
    classifying the maneuver as a curvy road in response to a determination that the magnitude of the horizontal displacement exceeds the threshold.

7. The method of claim 6 wherein the velocity of the vehicle is determined from readings of a global positioning system (GPS) residing in the mobile phone.

8. The method of claim 1 wherein determining horizontal displacement further comprises
    determining velocity of the vehicle along the direction of travel;
    determining angular speed of the vehicle about a vertical axis of the geographic coordinate system; and
    determining horizontal displacement as a function of velocity and angular speed of the vehicle.

9. The method of claim 1 further comprises
    determining a difference in vehicle heading angle between start and end of vehicle maneuver; and
    further classifying a turn as either a right turn, a left turn or a U-turn in accordance with the difference in vehicle heading angle.

10. The method of claim 1 further comprises measuring motion of the vehicle using a motion sensor residing in the mobile phone.

11. The method of claim 10 wherein the motion sensor is further defined as at least one of a gyroscope or an accelerometer.

12. A method for detecting vehicle maneuvers using a computing device in a vehicle, comprising:
    receiving, by a processor of the computing device, a signal from an inertial sensor of the computing device while the vehicle is moving, where the signal is indicative of angular speed of the vehicle about a vertical axis;
    detecting, by the processor, one or more pulses in the signal within a fixed time period, where one pulse with the fixed time period correlates to a possible turn by the vehicle and two pulses within the fixed time period correlates to a possible lane change by the vehicle;
    determining, by the processor, a direction of travel for the vehicle;
    determining, by the processor, a horizontal displacement of the vehicle relative to the direction of travel;
    comparing, by the processor, magnitude of the horizontal displacement to a first threshold, where the comparison is performed in response to detecting two pulses in the signal;
    classifying vehicle maneuver as a curvy road in response to a determination that the magnitude of the horizontal displacement exceeds the first threshold; and classifying vehicle maneuver as a lane change in response to a determination that the magnitude of the horizontal displacement is less than the first threshold.

13. The method of claim 12 further comprises detecting two pulses in the signal within the fixed time period;

determining, by the processor, whether amplitude of first pulse of the two detected pulses is higher or lower than a baseline value;

classifying the vehicle maneuver as a possible change to left lane in response to determining that the amplitude of the first pulse is higher than a baseline value; and classifying the vehicle maneuver as a possible change to right lane in response to determining that the amplitude of the first pulse is lower than a baseline value.

14. The method of claim 12 further comprises determining, by the processor, whether amplitude of the one detected pulse is higher or lower than a baseline value;

classifying the vehicle maneuver as a possible left turn in response to determining that the amplitude of the one detected pulse is higher than a baseline value; and classifying the vehicle maneuver as a possible right turn in response to determining that the amplitude of the one detected pulse is lower than a baseline value.

15. The method of claim 14 further comprises comparing, by the processor, magnitude of the horizontal displacement to a right turn threshold, where the comparison is performed in response to classifying the vehicle maneuver as a possible right turn;

classifying vehicle maneuver as a curvy road in response to a determination that the magnitude of the horizontal displacement exceeds the right turn threshold; and classifying vehicle maneuver as a right turn in response to a determination that the magnitude of the horizontal displacement is less than the right turn threshold.

16. The method of claim 15 further comprises comparing, by the processor, magnitude of the horizontal displacement to a left turn threshold, where the comparison is performed in response to classifying the vehicle maneuver as a possible left turn;

classifying vehicle maneuver as a curvy road in response to a determination that the magnitude of the horizontal displacement exceeds the left turn threshold; and classifying vehicle maneuver as a right turn in response to a determination that the magnitude of the horizontal displacement is less than the left turn threshold, where the value of the left turn threshold differs from value of the right turn threshold.

17. The method of claim 12 further comprises converting, by the processor, the signal a device coordinate system to a geographic coordinate system, where wherein the signal is reported in the device coordinate system and the geographic coordinate system includes a vertical axis defined in relation to surface the vehicle is traversing upon and the vertical axis does not align with any of the axes that define the phone coordinate system.

18. The method of claim 12 wherein determining horizontal displacement further comprises determining velocity of the vehicle along the direction of travel;

determining angular speed of the vehicle about a vertical axis of the geographic coordinate system; and determining horizontal displacement as a function of velocity and angular speed of the vehicle.

19. The method of claim 18 wherein the velocity of the vehicle is determined from readings of a global positioning system (GPS) residing in the mobile phone.

20. The method of claim 12 further comprises measuring the angular speed of the vehicle about a vertical axis using the inertial sensor in the computing device.

\* \* \* \* \*